U. WEDGE.
LEACHING APPARATUS.
APPLICATION FILED MAR. 1, 1915.
1,229,839.
Patented June 12, 1917.
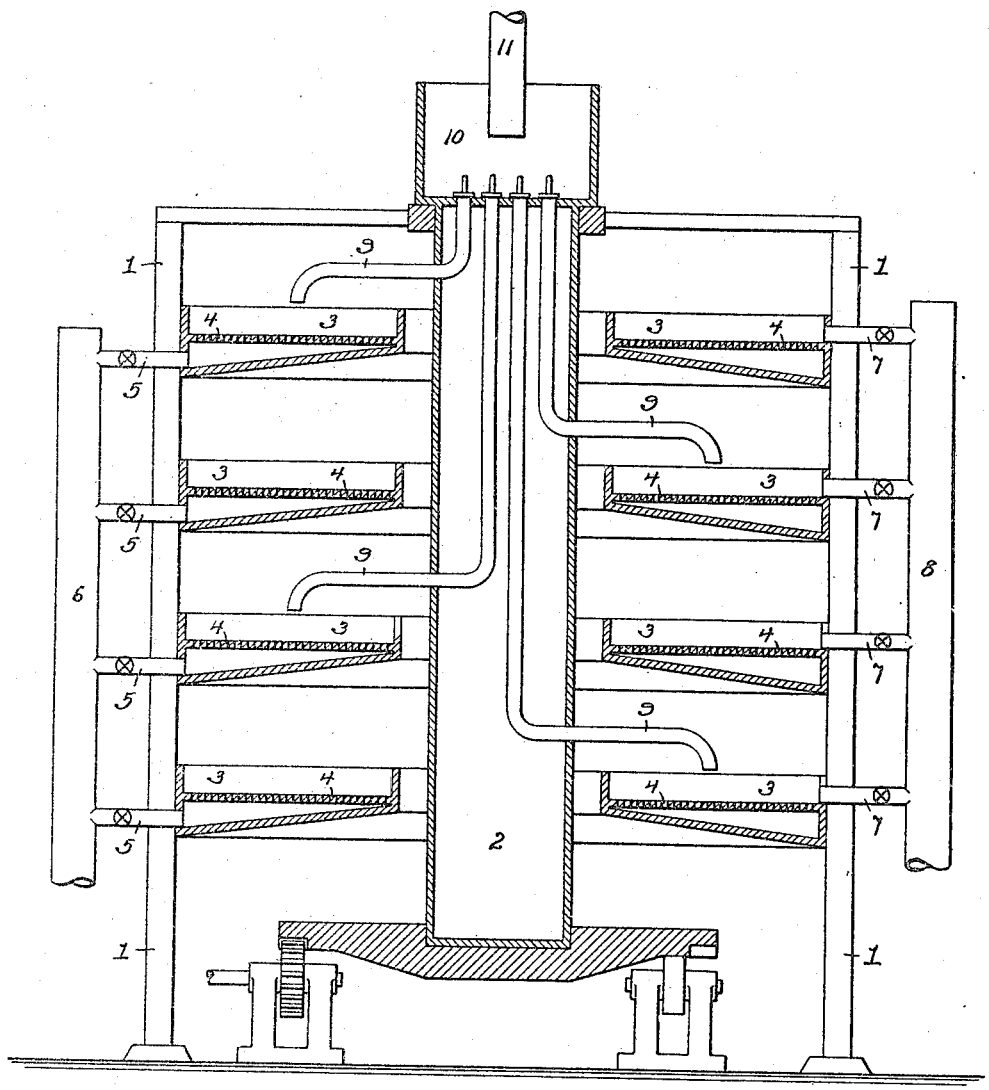

UNITED STATES PATENT OFFICE.

UTLEY WEDGE, OF ARDMORE, PENNSYLVANIA.

LEACHING APPARATUS.

1,229,839.  Specification of Letters Patent.  Patented June 12, 1917.

Application filed March 1, 1915. Serial No. 11,364.

*To all whom it may concern:*

Be it known that I, UTLEY WEDGE, a citizen of the United States, residing in Ardmore, Pennsylvania, have invented certain Improvements in Leaching Apparatus, of which the following is a specification.

The object of my invention is to so construct a machine for leaching ores or other material that it will have a large capacity in proportion to its size, and will permit rapid and effective operation, and ready charging and discharging.

This object I attain in the manner hereinafter set forth, reference being had to the accompanying drawing which represents in vertical section a simple form of leaching device constructed in accordance with my invention.

The machine shown in the drawing comprises an outer vertical structure or framework 1, composed by preference of suitably braced vertical legs, which support a series of superposed annular pans 3, each having a perforated false bottom 4, the chamber between the bottom of each pan and the false bottom 4 communicating, through a valved pipe 5, with a discharge pipe 6 common to all of the pans. In like manner the chamber of each pan above the false bottom communicates, through a valved pipe 7, with a discharge pipe 8 common to all of the pans. Axially disposed in respect to the pans is a shaft 2, which may be supported and rotated in any available manner and this shaft carries a series of pipes 9, one for each of the pans 3, these pipes discharging into the pans above the perforated false bottoms of the same, and communicating at their upper ends with a vessel 10 mounted at the top of the shaft 2, and receiving the leaching liquid or other material from a pipe 11.

In the operation of the machine the pans may be charged in any desired way with the material to be leached, for instance, said material may be mixed with water so as to readily flow through the pipes 9 and be discharged thereby into the respective pans 3, the solid matters being deposited upon the perforated false bottom 4 of each pan, and the liquid flowing off into the chamber below said perforated bottom and thence through one of the valved pipes 5 into the discharge pipe 6.

After the pans 3 have become filled with the ore or other material to be leached, the pipes 9 may be caused to discharge, into and through the mass, water or other solvent of soluble matters which may be mixed or combined with the ore, this operation being continued until the thorough leaching of the material in each pan has been effected, whereupon the valves in the pipes 5 may be closed and those in the pipes 7 opened so as to wash the material from the pans into the pipe 8, whereby it may be conveyed to any suitable point of discharge for further utilization.

Flow through the pipes 9 may be readily cut off by plugging the upper ends of said pipes or by equivalent means.

As the device is practically continuous in its operation the capacity of the same in proportion to its size is great and as the handling of the material is practically automatic the machine can be operated with a minimum expenditure of labor.

It is immaterial to my invention whether the pipes 9 or the pans 3, or both, rotate, and the flow of the leaching liquid may be either up or down.

Where one of the elements of the machine rotates such rotating element may perform various functions, for instance, it may serve to feed, uniformly throughout the pans, the material to be leached, to discharge such material from the pans after the leaching has been effected, or to stir or agitate it during the leaching operation, such feed, agitation or discharge being effected either by mechanical devices, or by liquid flow, and it may also serve to effectively and uniformly distribute the leaching liquid throughout the mass of material to be leached after said material has been deposited in the pans.

I claim:

1. The combination, in a leaching apparatus, of a series of superposed pans, each having a perforated false bottom, means for conveying the material to be leached to said pans, a pair of discharge pipes, one communicating with each of the pans below the false bottom and the other communicating with each of the pans above said false bottom, and valved connections through which such communications are effected.

2. The combination, in a leaching apparatus, of a series of superposed pans, each having a perforated false bottom, means for feeding to said pans material to be leached, means for rotating one of said elements in respect to the other, a pair of discharge pipes, one communicating with each of the pans below the false bottom thereof and the other communicating with each of the pans above said false bottom, and valved connections through which such communications are effected.

In testimony whereof, I have signed my name to this specification, in the presence of two subscribing witnesses.

UTLEY WEDGE.

Witnesses:
 KATE A. BEADLE,
 HAMILTON D. TURNER.

Copies of this patent may be obtained for five cents each, by addressing the "Commissioner of Patents, Washington, D. C."